US012623605B2

(12) United States Patent
Midgley

(10) Patent No.: US 12,623,605 B2
(45) Date of Patent: May 12, 2026

(54) SLIDING STEP

(71) Applicant: Harry Ernst Sorensen Midgley, Brackendale (CA)

(72) Inventor: Harry Ernst Sorensen Midgley, Brackendale (CA)

( * ) Notice: Subject to any disclaimer, the term of this patent is extended or adjusted under 35 U.S.C. 154(b) by 0 days.

(21) Appl. No.: 19/038,266

(22) Filed: Jan. 27, 2025

(65) Prior Publication Data

US 2025/0242757 A1 Jul. 31, 2025

Related U.S. Application Data

(60) Provisional application No. 63/625,788, filed on Jan. 26, 2024.

(51) Int. Cl.
B60R 3/00 (2006.01)
(52) U.S. Cl.
CPC ..................................... B60R 3/007 (2013.01)
(58) Field of Classification Search
CPC ....................................................... B60R 3/007
See application file for complete search history.

(56) References Cited

U.S. PATENT DOCUMENTS

| | | | | |
|---|---|---|---|---|
| 6,017,045 | A * | 1/2000 | Dermody | B60R 3/00 280/169 |
| D717,708 | S | 11/2014 | Romero et al. | |
| 11,505,128 | B2 | 11/2022 | Du et al. | |
| 11,518,311 | B2 * | 12/2022 | Kaddouh | B60R 3/007 |
| 2023/0009100 | A1 * | 1/2023 | McNeely | B60R 3/00 |

OTHER PUBLICATIONS

Standard Bed Retractable Bed Step in Anthracite, retrieved from the internet, retrieved on Jan. 22, 2025; <URL: https://accessories.chevrolet.com/product/standard-bed-retractable-bed-step-in-anthracite-22799283?d_adgroup=58700008191968995&d_adsrc=4568612&d_campaign=71700000103054257&d_keyword=PRODUCT_GROUP&d_site=GOOGLE&d_src=4635447&gad_source=1&gclick=CjwKCAiA04arBhAkEiwAuNOsIrtSWxljdpfMcNt2W1Zznrl0IK1_GLIJQTI4E0CrFj94dY8jcbVURRoCIIcQAvD_BwE&gclid=CjwKCAiA04arBhAkEiwAuNOsIrtSWxljdpfMcNt2.
RealTruck AMP Research PowerStep, retrieved from the internet, retrieved on Jan. 22, 2025; <URL: https://realtruck.com/p/amp-research-power-step/amp-76153-01a/?gad_source=1&gclid=CjwKCAiA04arBhAkEiwAuNOsInzbyHLTOVm99OeCO3YumaJeuiOYc4nN-9rVzR5fnZkP4PsbYR_d5hoCSn0QAvD_BwE&irclickid=UNCyGsVojxyKR9YXfrVk90xOUksxHzWFyy:BwM0&irgwc=1&utm_source=Impact&utm_medium=affiliate&utm_campaign=4328530_JoinGekko.com&?refid=.
Front Removable Assist Steps, retrieved from the internet, retrieved on Jan. 22, 205; <URL: https://accessories.chevrolet.com/product/front-removable-assist-steps-84808889?d_adgroup=58700008191968995&d_adsrc=4568612&d_campaign=71700000103054257&d_keyword=PRODUCT_GROUP&d_site=GOOGLE&d_src=4635447&gad_source=1&gclick=CjwKCAiA04arBhAkEiwAuNOslgTjkjU-gMJLP1ZYPC3PXV5-.

* cited by examiner

*Primary Examiner* — Bryan A Evans

(57) ABSTRACT

A foot step device for vehicles, comprising a body member with a cantilever-style design configured to mount onto stock rock slider rails without additional hardware. The body includes a semi-circular aperture for secure clipping, parallel ridges for grip, and smooth transitions for ergonomic use and safety. The device is adjustable along the rails, reinforced with internal ribs and recesses for structural integrity, and fabricated from lightweight, durable materials. Optimized for off-road and utility vehicles, it provides a non-invasive, adaptable, and space-efficient stepping solution.

18 Claims, 6 Drawing Sheets

SLIDING STEP

FIELD OF THE INVENTION

The present invention relates to vehicle accessories, and more specifically to a foot step device designed to be mounted on the stock rock slider rails of a Chevrolet Colorado ZR2 for ease of access to the vehicle.

BACKGROUND OF THE INVENTION

Vehicles, such as trucks and off-road vehicles like the Chevrolet Colorado ZR2, are often positioned higher off the ground, making it challenging for individuals to enter and exit the vehicle.

Various solutions have been developed, including fixed steps, retractable steps, and aftermarket step accessories. However, these solutions often present drawbacks, such as complicated installation processes, added vehicle weight, and limited flexibility in step positioning to meet user preferences.

Many existing steps are constructed from heavy materials like steel or aluminum, which can significantly increase the vehicle's weight. This added weight may reduce fuel efficiency and negatively impact performance, particularly in off-road environments.

Additionally, installation of these steps often requires drilling or other permanent modifications to the vehicle's body or frame. Such modifications may be undesirable for vehicle owners or leaseholders who want to preserve the vehicle's original condition.

Furthermore, most currently available steps are fixed in position after installation, preventing users from adjusting the step to their preferred location. This lack of adjustability can be inconvenient for users of different heights, physical abilities, or for situations where varying terrains require different step positions for safe and convenient access.

Accordingly, there is a need for an improved vehicle step, particularly for vehicles like the Chevrolet Colorado ZR2, that is lightweight, easy to install without requiring permanent modifications, adjustable in position, and made from durable materials capable of withstanding the demanding conditions of off-road use.

The present invention is intended to solve the problems associated with conventional devices and methods and provide improvements on these devices.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present invention provides a clip-on foot step designed to attach to the stock rock slider rails of the Chevrolet Colorado ZR2 or similar vehicles. This foot step is lightweight, adjustable, and requires no additional hardware or tools for installation.

The foot step includes a body member with an aperture that acts as a clip, allowing it to securely attach to the rock slider rails. The design uses a cantilever-style structure, which extends horizontally and is unsupported at one end, relying on the rock slider rails for stability. The body member features smooth edges and transitions for ergonomic use and safety.

The foot step is made from PETG-CF, a composite material combining polyethylene terephthalate glycol-modified (PETG) and carbon fibers. This material provides strength and durability while keeping the step lightweight (approximately 0.5 kilograms), ensuring minimal impact on vehicle performance and fuel efficiency.

The invention is easy to install and adjust, allowing users to position the step along the rock slider rails to their preferred position. It can be quickly attached or removed without tools, making it ideal for temporary use or for removal during off-road activities.

In some embodiments, the foot step includes a horizontal platform as the step surface, with rectangular recesses and protrusions for reinforcement. The rear of the step may feature parallel ridges for grip and mounting. Certain designs may also include a clip mechanism for secure attachment and easy detachment.

This invention offers a practical, user-friendly, and non-invasive solution for adding a foot step to off-road and utility vehicles, addressing the limitations of conventional steps by providing a lightweight, adjustable, and removable option.

DETAIL DESCRIPTIONS OF THE INVENTION

Figure 1:
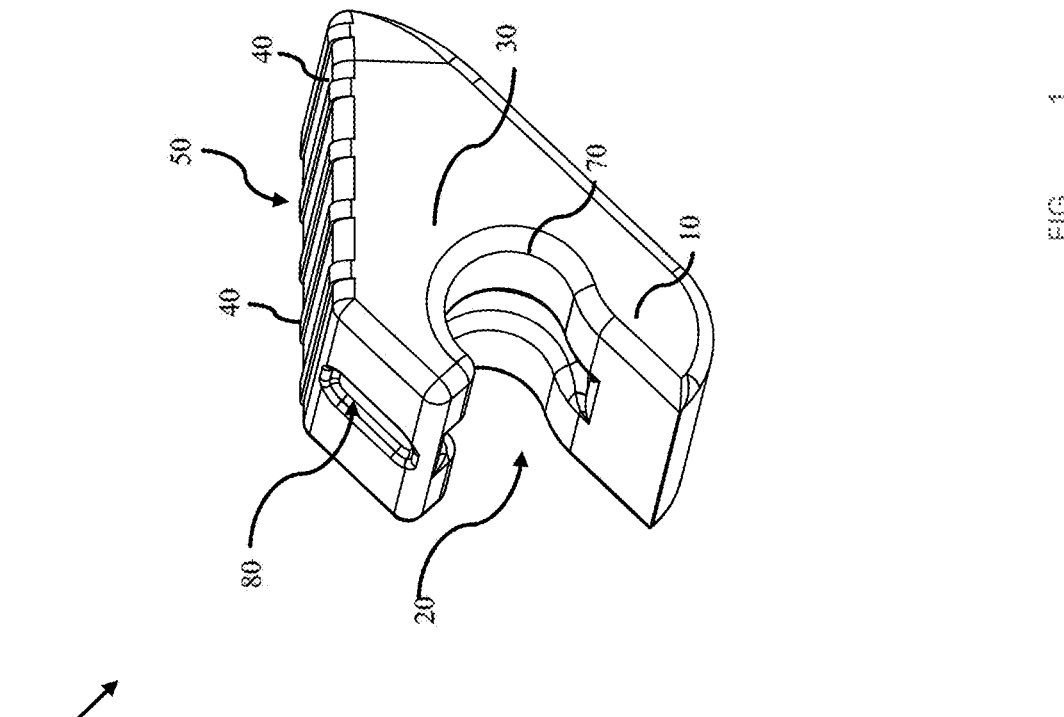
FIG. 1 is an illustration of one embodiment of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explic- itly appear in the claim itself.

Additionally, it is important to note that each term used herein refers to that which an ordinary artisan would under- stand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The present invention provides a no-hardware, clip-on foot step that is designed to mount on the stock rock slider rails along the lower body of the Chevrolet Colorado ZR2. The present invention 100, as shown in FIGS. 1-5, com- prises a body member 10 having an aperture 20 configured to function as a clip. The body member 10 forms a cantilever style foot step (design) 30 characterized by its ease of installation and adjustability, allowing users to slide it along the rock slider rails to a position that suits their individual preference.

In some embodiments, the present invention may include a contoured body with a main horizontal platform 50, which can be the step surface. This platform may lead into a curved structure (an aperture 20) that might function as a track for sliding. In some embodiments, the present invention may include one or more rectangular recesses 80 in the body of the present invention, as shown in FIG. 1, and protrusions, possibly for reinforcement or to engage with other parts of the mechanism. The present invention may include a plu- rality of parallel ridges 40, which could provide grip. In preferred embodiment, the design is ergonomic, with smooth transitions and rounded edges to ensure safety and space efficiency.

In preferred embodiment, the foot step of the present invention 100 is fabricated from PETG-CF material, which is a composite of polyethylene terephthalate glycol-modified (PETG) and carbon fibers (CF). This material choice offers an excellent balance of strength and durability while main- taining a light weight, approximately 0.5 kilograms, (or 1.0 kg in other embodiment) which minimizes the impact on the vehicle's performance and fuel efficiency.

Unlike conventional steps, the proposed foot step 100 requires no additional hardware or tools for installation, making it an ideal solution for users who seek a temporary or adjustable step option. The design allows for quick attachment and detachment from the vehicle, providing versatility and convenience for users who may only need a step occasionally or wish to remove it for off-road adven- tures.

In one embodiment, the present invention may include a cantilever design (structure) 30 that comprises a rigid struc- tural element that extends horizontally and is unsupported at one end.

The cantilever style design (structure) 30 ensures that the step 100 is securely held in place by leveraging the structure of the stock rock slider rails, without the need for drilling or permanent fixtures. This innovative approach addresses the need for a non-invasive, adaptable, and lightweight foot step solution for the Chevrolet Colorado ZR2 and potentially other vehicles with similar configurations.

Figure 2:
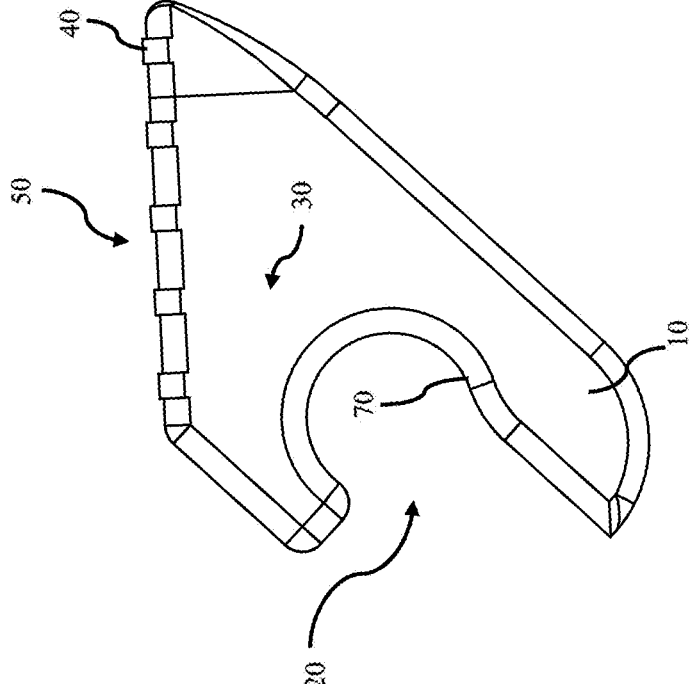
FIG. 2 is a side view of one embodiment of the present invention.

In one embodiment, as shown in FIGS. 1-2, the present invention may provide a foot step device 100 for a vehicle, comprising:

a body member 10 configured to mount onto stock rock slider rails (of a vehicle without requiring additional hardware or tools;

an aperture 30 in the body member 10 configured to function as a clip for secure attachment to the rock slider rails;

a cantilever-style design (structure) 30 of the body mem- ber 10, wherein the foot step device 100 extends horizontally and is unsupported at one end;

wherein the body member 10 includes smooth transitions and rounded edges to ensure ergonomic use, safety, and space efficiency.

Figure 3:
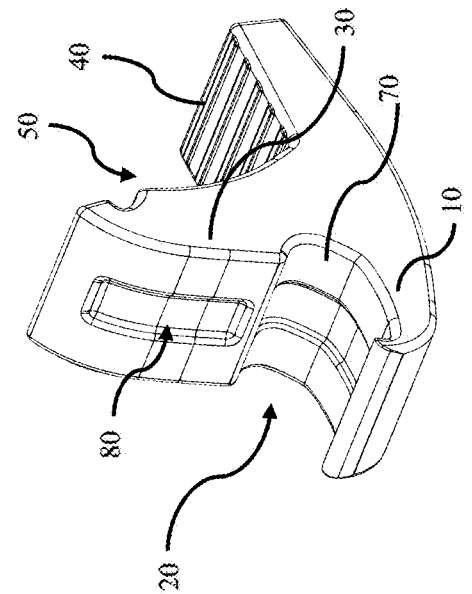
FIG. 3 is an illustration of an alternative embodiment of the present invention showing the rear body member with an angled portion.
Figure 3A:
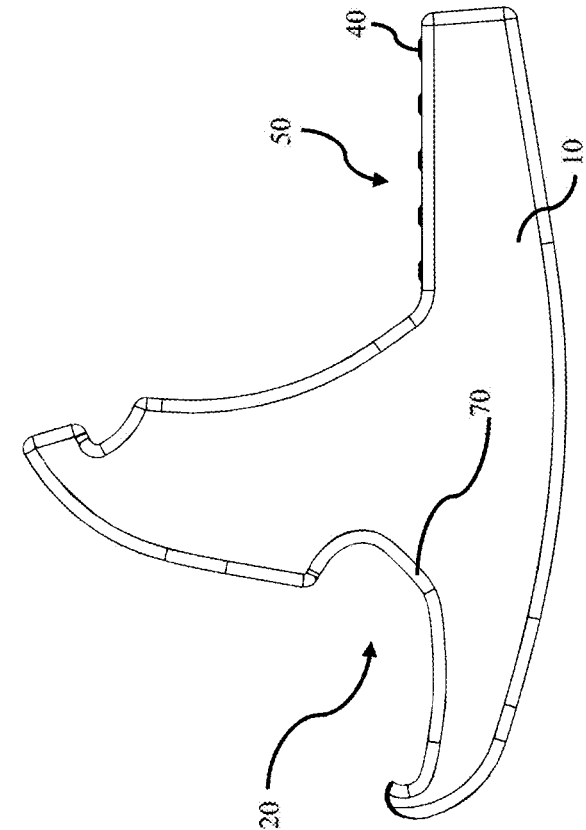
FIG. 3A is a side view of the alternative embodiment of the present invention shown in FIG. 3.

In other embodiment, as shown in FIG. 3, the present invention may provide a foot step device 100 for a vehicle, comprising:

a contoured body 10 with a main horizontal platform 50 configured as a step surface;

wherein the platform 50 having an angled portion and a vertical member (or surface) which may serve as a grip/stop for cantilever function;

a curved structure 20 extending from the platform 50, configured to function as a track for sliding along the rock slider rails;

one or more rectangular recesses 80 (and/or protrusions) on the horizontal platform 50 for reinforcement or engagement with other parts of the mechanism;

as shown in FIG. 3, a plurality of parallel ridges 40 at the platform 50, configured to provide grip for the user;

wherein the body member 10 is fabricated from PETG-CF material, a composite of polyethylene terephthalate glycol-modified (PETG) and carbon fibers, to provide strength, durability, and lightweight characteristics.

Figure 4:
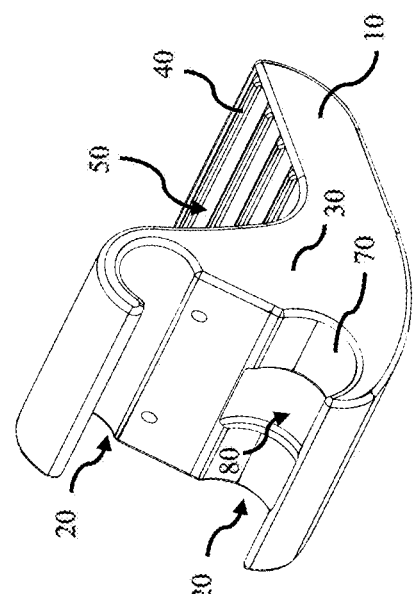
FIG. 4 is an illustration of an alternative embodiment of the present invention showing two apertures and showing the rear body member with an angled portion.
Figure 5:
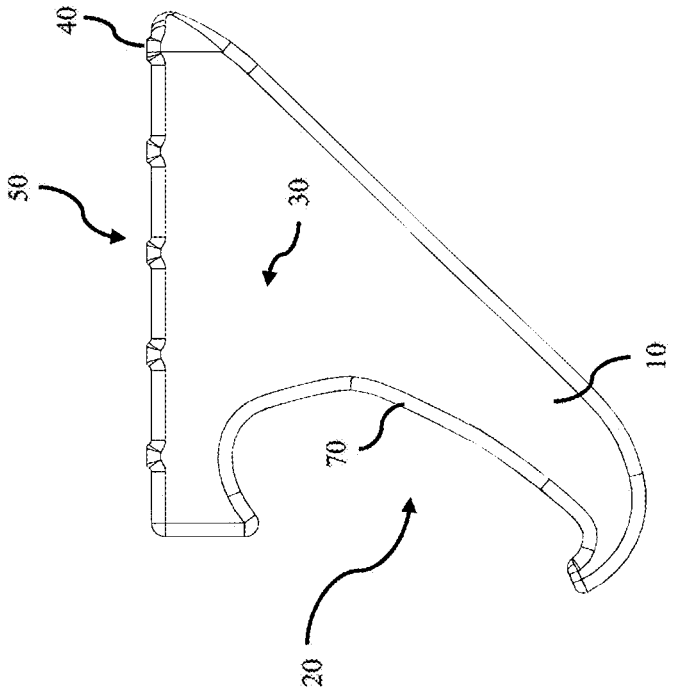
FIG. 5 is a side view of an alternative embodiment of the present invention shown in FIG. 2.

In some other embodiments, as shown in FIG. 4, the present invention may provide a foot step device 100 for a vehicle, comprising:

a body member 10 configured to mount onto stock rock slider rails (rocker panel guards) of a vehicle without requiring drilling or permanent fixtures, where body member 10 is made of lightweight material, weighing approximately 0.5 kilograms, to minimize impact on vehicle performance and fuel efficiency;

at least one semi-circular aperture 20 (which can be two separate apertures 20) in the body member 10 config- ured to securely clip onto the rock slider rails;

a platform 50 having an angled portion;

a cantilever-style design (structure) 30 that leverages the structure of the rock slider rails to support the step 100 without additional hardware; and an integrated clip mechanism (structure) within the semi- circular aperture 20, configured to engage and disen- gage the rock slider rails with minimal effort, enabling quick attachment and detachment while ensuring a secure fit during use.

In some embodiments, the body member 10 may include at least one detachable semi-circular aperture 20.

The present invention, therefore, represents a significant advancement in the field of vehicle accessories, particularly for off-road and utility vehicles, by offering a practical, user-friendly, and efficient foot step solution.

Although the invention has been explained in relation to its preferred embodiment, it is to be understood that many other possible modifications and variations can be made without departing from the spirit and scope of the invention.

What is claimed is:

1. A foot step device for a vehicle, comprising: a single-piece body member configured to removably mount onto a rocker panel guard of the vehicle by elastic deflection of an integrated clip without requiring additional hardware or tools; the body member comprising an aperture having a chordal opening sized to receive an edge of the rocker panel guard, the aperture being integrally formed in the body member and configured to function as a resilient clip for secure attachment to the rocker panel guard; and a cantilever-style design in the body member, wherein, when mounted, the body member extends horizontally from the rocker panel guard and is unsupported at a free distal end.

2. He foot step device of claim 1, wherein the body member comprises at least one platform.

3. He foot step device of claim 2, wherein the cantilever-style design is optimized to distribute weight evenly across the rock slider rails, ensuring stability and durability during use.

4. He foot step device of claim 3, wherein the aperture includes a curved, semi-circular profile to ensure a snug fit around the rocker panel guards.

5. He foot step device of claim 1, wherein the body member is fabricated using an additive manufacturing process to achieve precise tolerances and lightweight construction.

6. He foot step device of claim 1, wherein the body member includes smooth transitions between surfaces and rounded edges, the smooth transitions reducing stress concentrations and improving structural integrity, and the rounded edges minimizing sharp corners to enhance user safety and prevent accidental injury during use.

7. He foot step device of claim 1, wherein the body member is dimensioned and contoured to fit the rocker panel guards of the Chevrolet Colorado ZR2.

8. He foot step device of claim 3, wherein the body member is constructed from a lightweight, durable material resistant to corrosion and impact.

9. Foot step device for a vehicle, comprising: a contoured body member with a main horizontal platform configured as a step surface; wherein the main horizontal platform includes an angled portion; one or more rectangular recesses and protrusions on the main horizontal platform; and a plurality of parallel ridges in the contoured body member, configured to provide grip for the user; wherein the contoured body member is fabricated from PETG-CF material, a composite of polyethylene terephthalate glycol-modified (PETG) and carbon fibers, to provide strength, durability, and lightweight characteristics.

10. He foot step device of claim 9, wherein the main horizontal platform includes: one or more rectangular recesses and protrusions for reinforcement or engagement with other parts of the mechanism, enhancing structural rigidity and stability.

11. He foot step device of claim 10, wherein the PETG-CF material is configured to provide resistance to environmental factors including UV radiation, moisture, and temperature fluctuations.

12. He foot step device of claim 11, wherein the rectangular recesses on the main horizontal platform are configured to reduce material weight while maintaining structural integrity.

13. He foot step device of claim 12, wherein the plurality of parallel ridges are spaced evenly to enhance grip and provide additional structural support.

14. Foot step device for a vehicle, comprising: a body member configured to mount onto rocker panel guards of a vehicle by snap-fit engagement without requiring drilling or permanent fixtures, where the body member is made of lightweight material to minimize impact on vehicle performance and fuel efficiency; at least one semi-circular aperture in the body member configured to securely clip onto the rocker panel guards; a platform having an angled portion and a vertical surface; a cantilever-style design that leverages the rocker panel guards to support the foot step device without additional hardware; and an integrated clip mechanism within the semi-circular aperture, configured to engage and disengage the rocker panel guards with minimal effort, enabling quick attachment and detachment while ensuring a secure fit during use.

15. He foot step device of claim 14, wherein the body member includes at least one detachable semi-circular aperture.

16. He foot step device of claim 14, wherein the cantilever-style design includes reinforcement ribs to increase load-bearing capacity.

17. He foot step device of claim 14, wherein he body member is dimensioned to remain within the lateral and vertical clearance of the vehicle's rocker panel guards, ensuring that the foot step device does not protrude excessively or interfere with the vehicle's off-road capabilities, ground clearance, or overall aesthetics.

18. He foot step device of claim 17, wherein the integrated clip mechanism comprises a clip or locking mechanism integrated into the semi-circular aperture, allowing users to securely attach or detach the foot step device without tools, enabling easy removal for off-road use or temporary applications.

* * * * *